Figure 1:
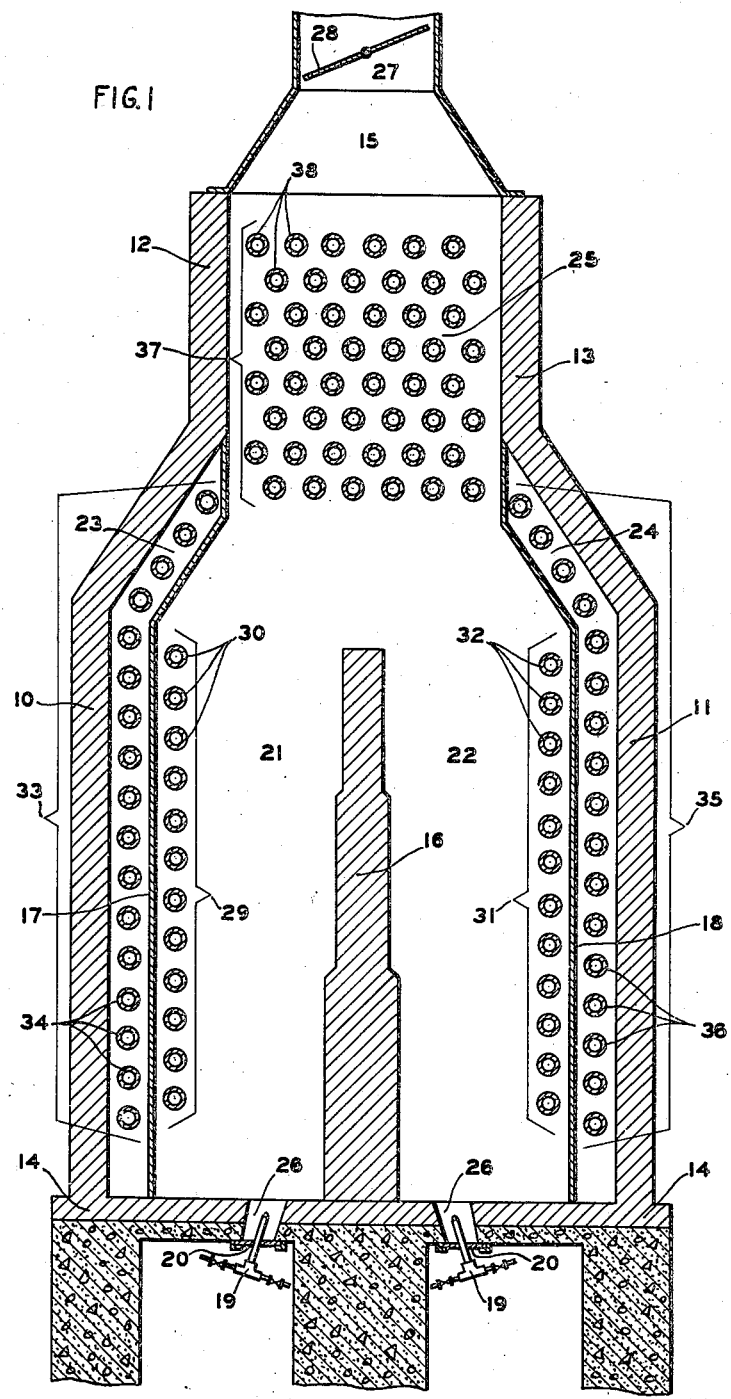

Dec. 5, 1939. J. B. HEID 2,182,586
HEATING OF FLUIDS
Filed March 11, 1938 2 Sheets-Sheet 1

INVENTOR
JACOB BENJAMIN HEID
BY *Lee J Gary*
ATTORNEY

Dec. 5, 1939.  J. B. HEID  2,182,586
HEATING OF FLUIDS
Filed March 11, 1938  2 Sheets-Sheet 2

INVENTOR
JACOB BENJAMIN HEID
BY
*Lee Cary*
ATTORNEY

Patented Dec. 5, 1939

2,182,586

UNITED STATES PATENT OFFICE 2,182,586

HEATING OF FLUIDS

Jacob B. Heid, Chicago, Ill., assignor to Universal Oil Products Company, Chicago, Ill., a corporation of Delaware Application March 11, 1938, Serial No. 195,237

4 Claims. (Cl. 122—356)

This invention relates to an improved form of heater, for fluids, which is particularly adapted to heat hydrocarbon oils to the high temperatures required for their pyrolytic conversion. The invention also embodies improved methods of heating which may be employed in the furnace structure provided.

The improved furnace structure provided by the invention is of the up-fired type. It has a central bridge wall which divides the lower portion of the furnace into two independently fired combustion and heating zones, and, in addition, provides two zones of different heat intensity in each of the two lower portions of the furnace on opposite sides of the central bridge wall. The tubular elements or fluid conduit in two of the last mentioned zones (one on each side of the bridge wall) are each heated by direct radiation from flames and hot combustion gases generated in the combustion and heating zone on one side of the bridge wall and by direct radiation from the adjacent highly heated surface of the bridge wall. The tubular elements in the other two heating zones, disposed adjacent the side walls of the furnace on opposite sides of the bridge wall, are supplied with radiant heat transmitted through a refractory wall or screen which shields them from direct radiation from the flames and hot combustion gases. The tubular elements or fluid conduit in another heating zone receive fluid heat transmitted thereto by direct contact with combustion gases generated in both combustion and heating zones, after a large proportion of the radiant heat has been extracted from said gases in the previously mentioned heating zones.

It will be apparent from the above that several zones of different heat intensity are provided, in which different portions of the fluid conduit, through which the oil passes for heat treatment, are disposed. These different portions of the fluid conduit may be interconnected in a number of different manners to provide various sequences of flow therethrough, whereby the heating conditions to which the oil is subjected in various stages of its heat treatment may be varied to suit the requirements of the particular type of oil undergoing treatment. The direction of flow through each portion of the fluid conduit may also be varied and a further degree of independent control over the rates of heat input at different stages in the heat treatment is obtainable by independent firing of the two combustion and heating zones whereby the heating conditions obtained in each are independently controlled.

The invention also specifically contemplates the separate and independent heat treatment of two or more streams of different oils by employing split-stream or parallel flow through different portions of the fluid conduit and the same or a similar flow arrangement may be employed for heating two separate streams of the same oil under substantially identical conditions by employing the same firing conditions in both heating and combustion zones of the furnace.

One of the important features and advantages of the furnace structure herein provided resides in the flexibility of operation which is obtainable by varying the arrangement and sequence of flow through various sections of the fluid conduit and/or by control of the firing conditions in the two independent combustion and heating zones, whereby the type of heating curve obtained may be varied to suit the particular requirements of the type of oil undergoing treatment. Thus the heater is adapted to efficiently crack practically any type of oil without change in the physical structure of the heater except for the cross-over connections between the various sections of the fluid conduit. These connections may be conveniently located outside the furnace walls so that they are readily accessible and easily changed without disturbing the main furnace structure.

Another important feature of the invention resides in the high average rate of heat input which may be obtained throughout the entire fluid conduit without the danger of excessive heating and over-cracking in any portion thereof. This results in what is known as high tube efficiency and makes possible a considerable saving in cost as compared with conventional heaters which must employ lower average rates of heating to avoid overheating in certain sections of the fluid conduit and, therefore, require a greater length of fluid conduit.

Other features and advantages of the invention will be apparent with reference to the accompanying diagrammatic drawings and the following description thereof. Fig. 1 of the drawings is a cross-sectional elevation of one specific form of heater provided by the invention. Figs. 2 to 6, inclusive, illustrate several of the many varied flows which may be employed through the heating coil or fluid conduit of the furnace structure shown in Fig. 1.

Referring to Fig. 1 of the drawings, the furnace structure here illustrated is of the rectangular type having lower side walls 10 and 11, upper side walls 12 and 13, a floor 14 and end walls which are not shown in this particular view.

A centrally disposed bridge wall or firing wall 16 extending upwardly from the floor of the furnace divides the lower portion thereof into two separate combustion and heating zones 21 and 22. Separate shielded radiant heat zones 23 and 24 are provided adjacent the respective side walls 10 and 11 and are separated from the adjacent combustion and heating zones 21 and 22 respectively by the respective walls 17 and 18 which are spaced from and extend substantially parallel to and continuous with the side walls of the furnace.

Walls 17 and 18 are constructed of any suitable material capable of transmitting radiant heat from zones 21 and 22 to zones 23 and 24 respectively. Metallic alloys capable of withstanding the high temperature preferably employed in the combustion and heating zones may be utilized for walls 17 and 18 or they may, when desired, be constructed of so-called super-refractories such as high temperature fire clay compositions, silicon carbide, and the like.

A fluid heating zone 25 is disposed centrally above the two combustion and heating zones 21 and 22 and is defined by the upper side walls 12 and 13 and the end walls of the furnace. A series of firing ports 26 are disposed in spaced relation within the floor 14 on each side of wall 16 and a burner 19 is provided at each firing port through which combustible fuel and air or steam are supplied to each combustion and heating zone. Additional air for combustion may be supplied through the firing ports in regulated quantities by adjustment of a suitable damper arrangement which is indicated, for example, at 20. The burners 19 are directed upwardly at an angle in such a manner that the flames and hot combustion gases issuing therefrom impinge upon the opposite faces of wall 16 and heat the same to a highly radiant condition. The hot combustion gases are appreciably cooled, as will be later described, in combustion and heating zones 21 and 22 and the partially cooled gases from the two combustion and heating zones commingle above wall 16 and pass through fluid heating zone 25 and thence through a suitable flue 15 to a stack 27 controlled by damper 28.

A tube bank 29, which in the particular case here illustrated, is a single substantially vertical row of horizontally disposed tubes 30, is disposed in zone 21 of the furnace adjacent wall 17. Tubes 30 receive predominantly radiant heat on one side directly from the flames and hot combustion gases passing through zone 21 and from the adjacent highly heated surface of wall 16 and are heated on their opposite sides by radiant heat reflected from wall 17.

A similar tube bank 31, also comprising a single substantially parallel row of horizontally disposed tubes 32, is disposed within combustion and heating zone 22 adjacent wall 18. Tubes 32 receive predominantly radiant heat on one side from the flames and hot combustion gases passing through zone 22 and from the adjacent highly heated surface of wall 16 and are heated on their opposite sides by reflected radiation from wall 18.

A tube bank 33, similar and substantially parallel to bank 29, is disposed on the side of wall 17 opposite bank 29 within heating zone 23 and the tubes 34 of this bank receive, on one side, screened radiant heat transmitted through wall 17 and, on the opposite side, reflected radiant heat from side wall 10.

Another bank 35, similar to bank 33 is disposed within heating zone 24 on the opposite side of wall 18 from tube bank 31. The tubes 36 of this bank also receive, on one side, screened radiant heat transmitted through wall 18 and, on the opposite side, reflected radiant heat from side wall 11.

Another tube bank 37 which, in the case here illustrated, comprises a plurality of horizontal rows of horizontally disposed tubes 38 is provided within fluid heating zone 25. The tubes of this bank receive fluid heat by direct contact with the combustion gases passing through this zone of the furnace from zones 21 and 22 and the lowermost rows of tubes of bank 37 also receive heat by radiation from the combustion gases and from the flames in zones 21 and 22.

It will be apparent from the above that there are three distinct types of heating zones in the heater herein provided, the tubular elements in one type of zone being heated predominantly by direct and reflected radiation, the tubes in another zone being heated substantially entirely by screened and reflected radiation, while the tubular elements in the other type of heating zone are heated by direct contact with the combustion gases. It will also be apparent that, for a given fluid velocity through the tubular elements in each of the various types of heating zone, different rates of heating will be obtained and, by varying the sequence of flow through the different tube banks, a wide variety of heating curves may be obtained. Therefore, by selecting a flow which will give the desired heating curve, practically any type of oil may be subjected in this heater to the conditions of heat treatment which are most suitable for obtaining the desired results and, by selection of the flow employed through the heating coil, high average rates of heating may be obtained without the danger of excessive heating and excessive cracking, which would result in excessive gas and coke formation. Further control of the heating curve may be obtained, with series flow through the various tube banks, by independent control of the firing conditions in combustion and heating zones 21 and 22. By dividing the various tube banks into two or more separate heating coils, in such a manner that a portion of one coil is disposed on one side of wall 16 and a portion of the other coil on the opposite side of wall 16, separate streams of different oils may each be subjected to independently controlled heating conditions in the single furnace structure. On the other hand, by employing substantially the same firing conditions in combustion zones 21 and 22 and passing one stream of oil through banks 29 and 33 and another substantially equal stream of the same oil through banks 31 and 35, two separate streams of the same oil may be subjected to substantially equal heating conditions.

Figure 2:
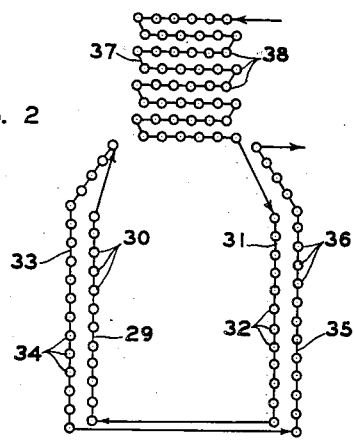

Figure 2 illustrates a flow through the various tube banks of the heater shown in Figure 1 which is advantageous, or example, in reforming or cracking relatively light oils which require prolonged soaking time at a relatively high temperature.

In Figure 2 the oil to be treated enters the uppermost row of tube bank 37, then flows in series through adjacent tubes and adjacent rows of tubes in this zone, in a general direction countercurrent to the flow of combustion gases therethrough. It then passes in series through banks 31 and 29, wherein it is heated to a relatively high cracking temperature, and finally passes in series through banks 33 and 35, which function as a soaking section wherein the oil may be maintained at a substantially constant temperature, relatively close to the maximum temperature previously attained, for a considerable time.

With the flow shown in Figure 2, substantially equal firing conditions may be maintained in the two combustion and heating zones of the furnace or, when desired, the heating curve may be varied somewhat by employing different firing conditions in the two combustion and heating zones.

Figure 3:
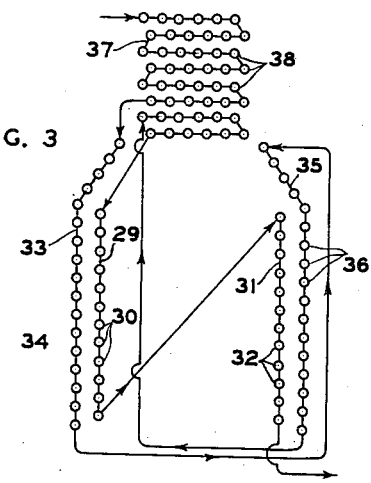

Fig. 3 illustrates a flow which may be employed through the various tube banks of the furnace illustrated in Fig. 1 to obtain progressively increasing rates of heating throughout the fluid conduit. As here illustated, the oil enters the uppermost row of tube bank 37 and flows in series through the adjacent tube and adjacent rows of tubes, with the exception of the two lowermost rows of this bank, in a general direction countercurrent to the flow of combustion gases therethrough and then passes downwardly through tube bank 33. It then passes in a general downward direction in series through the adjacent tubes of bank 35, thence in series through the two lowermost rows of tubes of bank 37, thence downwardly in series through adjacent tubes of banks 29 and 31, the general direction of flow being downward throughout the heating coil. In this case, higher rates of heating are obtained in tube banks 31 and 35, as compared with those obtained in the respective banks 29 and 33, by employing more severe firing conditions and higher temperatures in zone 22 than in zone 21 of Fig. 1.

By reversing the flow illustrated in Fig. 3, progressively decreasing rates of heating may be obtained throughout substantially the entire length of the heating coil.

Figure 4:
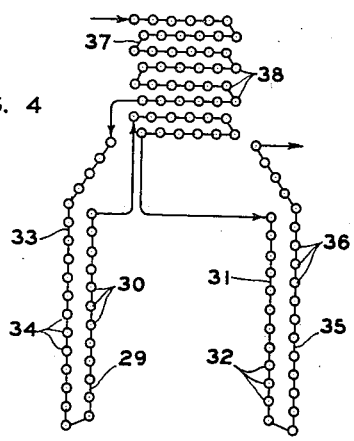

Fig. 4 illustrates a flow whereby relatively high rates of heating may be obtained in the midportion of the heating curve. In this case, the oil flows first downwardly in series through all but the two lowermost rows of tube bank 37 and thence passes in series in the order named through the adjacent tubes of banks 33, 29, the two lowermost rows of bank 37, bank 31 and bank 35. In this case, the same or different rates of heating may be employed in the two combustion and heating zones and may be regulated to suit requirements.

Figure 5:
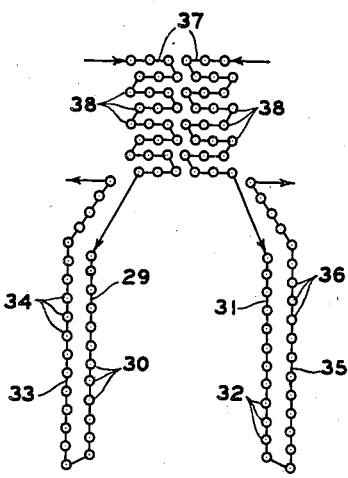

Fig. 5 illustrates a flow which may be employed for simultaneously heating two streams of different oils each under independently controlled conditions. In this particular case, the entire fluid conduit is divided into two substantially equal sections disposed on opposite sides of a vertical plane passing through wall 16 of Fig. 1. One stream enters the right hand section of bank 37, flowing downwardly through the adjacent tubes thereof in series and thence passes in series through banks 31 and 35. The other stream enters the left hand section of tube bank 37 flows downwardly in series through the adjacent tubes of this section and thence passes in series through banks 29 and 33. In this case, more severe firing conditions are employed in the combustion and heating zone wherethrough the oil to be subjected to the more severe cracking conditions passes, while milder heating and consequently lower cracking temperatures are obtained for the oil passing through the other section of the fluid conduit. Independent control of the heating conditions in the two sections of bank 37 are not obtained in this case, but this is not important since the streams of oil leaving these two sections will not ordinarily have attained an active cracking temperature.

Figure 6:
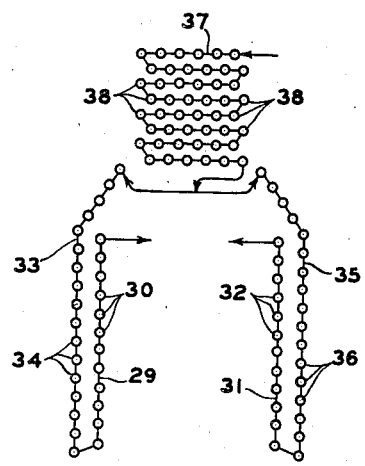

Figure 6 illustrates one specific flow which may be employed for simultaneously heating two separate streams of the same oil under substantially equal heating conditions. The oil first passes in a general downward direction through adjacent tubes and adjacent rows of tubes in bank 37 and upon leaving bank 37 is divided into two streams of substantially equal volume, one of which flows in series through tube banks 33 and 29, in the manner illustrated, while the other flows in the same manner through tube banks 35 and 31.

It will be understood that the flows shown in Figures 2 to 6, inclusive, illustrate only a few of the many possible variations and other specific flows will be readily apparent to those skilled in the art by reference to the foregoing specification and the specific illustrations.

I claim as my invention:

1. In combination with a furnace structure of the up-fired type, having a vertical wall disposed centrally between opposite side walls of the furnace, combustion zones on opposite sides of the central wall and a fluid heating zone disposed above said central wall, means including burners pointed upwardly toward opposite faces of said central wall for directing flames and hot combustion gases thereagainst and heating the same to a radiant condition, fluid conduits located on opposite sides of said central wall out of the main path of travel of said flames and hot combustion gases and exposed to heating by direct radiation from the flames, hot combustion gases and radiant surfaces of said central wall, an imperforate wall capable of transmitting radiant heat disposed adjacent and spaced from each of said side walls, fluid conduits disposed in the spaces provided between each of said side walls and said adjacent imperforate wall and fluid conduits disposed in the direct path of travel of combustion gases passing through said fluid heating zone from said combustion zones.

2. In a furnace having side and end walls, the lower portions of which define combustion and heating zones and the upper portions of which define a separate fluid heating zone, a vertical firing wall disposed centrally in relation to said side walls, a combustion zone on each side of said firing wall, an imperforate vertical wall capable of transmitting radiant heat disposed adjacent and spaced from said lower portion of each of the side walls, a substantially vertical row of horizontally disposed tubular fluid conduits between each of said side walls and the adjacent imperforate wall, a substantially vertical row of horizontally disposed tubular fluid conduits adjacent and on the opposite side of each of said imperforate walls from the first mentioned row of tubes, a plurality of superimposed horizontal rows of horizontally disposed tubular fluid conduits disposed in said fluid heating zone, means for independently supplying combustible fuel and air to each of said combustion zones and passing the resulting flames and hot combustion gases upwardly over and in intimate contact with the opposite faces of said firing wall and means for passing combustion gases from each of said combustion zones upwardly through said fluid heating zone in direct contact with the tubular fluid conduits disposed therein, each of the tubular fluid conduits other than those in said fluid heating zone being disposed outside the main path of travel of said flames and combustion gases.

3. In a furnace having a pair of outer parallel walls, and combination of an inner wall between, spaced from and parallel to said outer walls, means for passing flame and combustion gases along the opposite sides of said inner wall, a radiant heat transmitting wall within the furnace adjacent but spaced from each of said outer walls, heating tubes in the space between each of said radiant heat transmitting walls and the adjacent outer wall, and additional heating tubes adjacent each of said radiant heat transmitting walls on the side thereof facing said inner wall.

4. In a furnace having a pair of outer side walls, the combination of a vertical inner wall between and spaced from the side walls, means for passing flame and combustion gases in a vertical direction along the opposite sides of said inner wall, a vertical radiant heat transmitting wall within the furnace adjacent but spaced from each of the side walls, heating tubes in the space between each of said radiant heat transmitting walls and the adjacent side wall, and additional heating tubes adjacent each of said radiant heat transmitting walls on the side thereof facing said inner wall.

JACOB B. HEID.